Patented Nov. 23, 1937

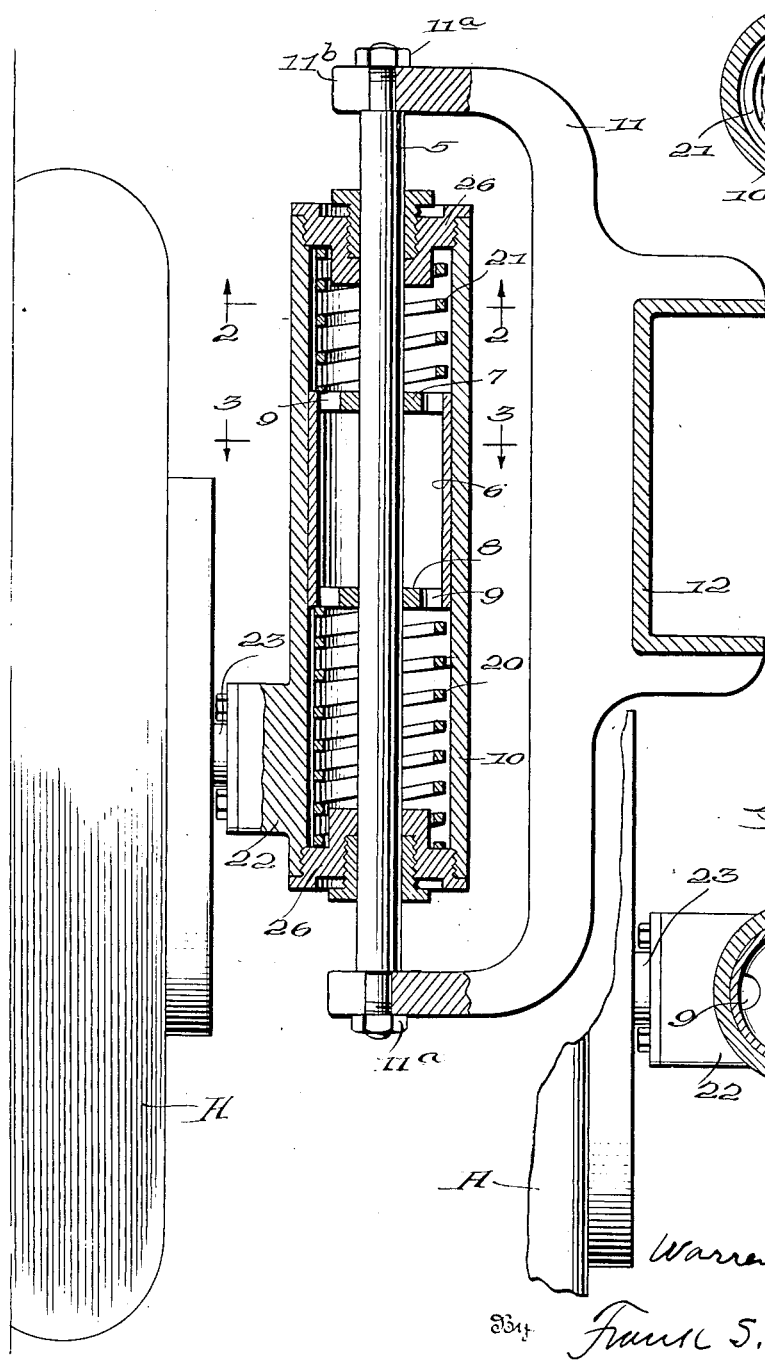
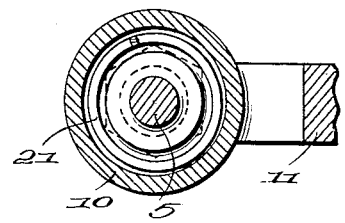
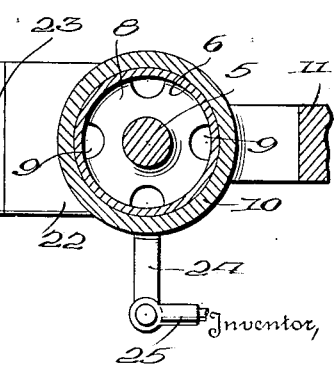

2,099,807

UNITED STATES PATENT OFFICE 2,099,807

KNEE ACTION AND CHASSIS SUSPENSION FOR AUTOMOBILES

Warren B. Gregory, Hurtsboro, Ala.

Application June 17, 1936, Serial No. 85,803

6 Claims. (Cl. 280—96.2)

This invention relates to suspensions for a chassis of automobiles which operate as substitutes for the usual elliptical or semi-elliptical springs now used in chassis suspension of automobiles and the accompanying spring shackles and pins now generally forming a part of such elliptical spring suspensions.

Furthermore, the invention operates as a shock absorber and eliminates the use of ordinary shock absorbers such as are commonly employed in connection with the aforesaid spring suspensions for chassis.

An object of the invention is to provide a chassis suspension which does not require elements corresponding to the usual front axles now commonly used in automobiles; and the invention furthermore obviates the use of king pins and bushings.

A further object of the invention is to provide a chassis suspension which is self-lubricating and therefore enables the operation of an automobile at reduced cost for lubrication as compared with the lubrication now necessary in automobiles having a front axle.

A still further object of the invention is to provide a chassis suspension which will result in more satisfactory riding comfort and by means which are comparatively inexpensive to manufacture and maintain.

It is furthermore an object of the invention to provide a suspension of the character indicated in which the steering instrumentalities are strong and durable and have a margin of safety greatly beyond that of the well known steering mechanisms now in common use.

With the foregoing and other objects in view, the invention consists in the details of construction and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a sectional view of a chassis suspending means embodying the invention, showing the same associated with a chassis frame;

Figure 2 illustrates a sectional view of the device on the line 2—2 of Fig. 1; and Figure 3 illustrates a sectional view thereof on the line 3—3 of Fig. 1.

In the drawing, 5 denotes a rod which may be termed a piston rod, in that a piston 6 is secured on it. The piston is preferably hollow and has heads 7 and 8 with apertures 9 therein, through which oil may circulate from end to end of the piston into the cylinder 10 in which the piston is fitted. The rod 5 has a bracket 11 connected to it at its ends and the said bracket is attached to the chassis frame 12 in any appropriate manner. The bracket 11 may have slots 11$^b$ at its ends to receive the extensions of the rod 5 for the purposes of assembly and the rod may be retained in place by any well known mechanical device. The construction of the bracket and the manner in which it is attached to the frame are details of construction which may be modified to suit particular requirements, but the illustrated mechanical means for attaching the bracket to the rod 5 and to the frame have been found satisfactory in use. The said means as illustrated consists in reducing the ends of the rod and applying the arms of the bracket to said reduced ends. The arms are held on the rod by nuts 11$^a$.

A load supporting spring 20 is located in the bottom of the cylinder 10 and the lower end of the piston rests on said spring. A coil spring 21 of less strength is installed in the cylinder above the piston and it serves as a shock absorber or as a means for limiting the rebound of the load so that with the presence of the oil in the cylinder it serves to check the movement of the cylinder to some extent, and by the action of the aforesaid springs, riding comfort of the automobile is insured.

A block or butt 22 is attached to the cylinder externally thereof and it is provided with the usual wheel spindle 23 on which a wheel A is mounted and by the partial rotation of the cylinder the steering of the automobile is accomplished. A steering arm 24 is attached externally of the cylinder also and the usual steering rod 25 may be connected to it and to the steering knuckle on the opposite front cylinder by the usual mechanical means so that the spindles of the two front wheels are oscillated horizontally in unison.

The cylinder is provided with apertured heads 26 through which the rod 5 extends and the said heads are provided with a packing for effecting leakproof joints between the heads and the rod 5, and thus the cylinder is permitted to rotate on said rod under the influence of the steering mechanism or to reciprocate axially of said rod.

The assembly results in the provision of three bearings of the cylinder on the rod 5, two of said bearings being the apertured heads or bushings 26, one on each end of the cylinder, and the piston on the rod operating in the central zone of the cylinder, and the stability insured by this arrangement will prevent lost motion between the cylinder and the said rod.

As the function and operation of the several parts of the apparatus have been stated in connection with a description of the parts thereof, a résumé of the operation is believed unnecessary for an understanding of the invention by one skilled in the art, and it will be apparent that owing to the relation of parts the aforesaid knee action is inherent in the structure.

I claim:

1. In knee action and chassis suspension for automobiles, a bracket adapted to be attached to the chassis of an automobile including a vertically disposed rod carried thereby, a cylinder mounted on said rod for vertical reciprocation and rotation, a piston on said rod on which the cylinder reciprocates and rotates, heads in the ends of the cylinder through which the rod projects, means between one head of the cylinder and the piston for yieldingly supporting the said cylinder, means between the other head of the cylinder and the said piston for checking the rebound of the chassis, steering mechanism associated with the cylinder, and a wheel mounting rigidly attached to the cylinder.

2. In knee action and chassis suspension for automobiles, a rod, means for attaching the said rod to the chassis frame of an automobile, a piston on said rod, a cylinder slidably and rotatably mounted on the said rod and piston, apertured heads in the cylinder through which the rod projects, yieldable means above and below the piston engaging the piston and the heads of the cylinder for restraining the axial movement of the cylinder on the said rod and piston, a wheel mounting on the said cylinder, and means associated therewith for steering the automobile.

3. In knee action and chassis suspension for automobiles, a rod having a hollow piston thereon, said piston having apertured heads for the circulation of oil therethrough, a cylinder rotatably and axially movable on the said piston, a supporting spring in the cylinder engaged by the lower end of said piston, a restraining spring in the said cylinder engaging the upper end of said piston and the said cylinder, a wheel mounting carried by the cylinder externally thereof, a chassis frame, and means for connecting the piston mediately to said chassis frame whereby the chassis frame is supported by the said supporting spring.

4. In knee action and chassis suspension for automobiles, a rod having a hollow piston thereon, said piston having apertured heads for the circulation of oil therethrough, a cylinder rotatably and axially movable on the said piston, a supporting spring in the cylinder engaged by the lower end of said piston, a restraining spring in the said cylinder engaging the upper end of said piston and the said cylinder, means attachable to a chassis of an automobile and to said rod for supporting a chassis, a wheel mounting carried by the cylinder externally thereof, and means for communicating motion to the cylinder for steering the automobile.

5. In knee action and chassis suspension for automobiles, a rod having a hollow piston attached hereto, a chassis frame, a rigid member connected to the rod and attached to the said chassis frame, said piston having apertured heads for the circulation of oil therethrough, a cylinder having axial and rotatable movement on the said piston, a supporting spring engaging the cylinder at one end and engaging the lower end of the piston, a wheel mounting on the cylinder externally thereof, and means for partially rotating the cylinder for steering the automobile.

6. In knee action and chassis suspension for automobiles, a bracket adapted to be attached to the chassis of an automobile including a vertically disposed rod carried thereby, a cylinder through which the rod extends, apertured heads at each end of the cylinder in which the said rod is located, a piston on the rod within the cylinder and with relation to which the cylinder is rotatable and reciprocable, the said piston being spaced from the aforesaid heads, a spring between the piston and one of the heads, a spring between the piston and the other of said heads, the said heads and cylinder comprising three bearing elements between the piston and said rod, a wheel mounting on the cylinder, and a steering mechanism connected to the said cylinder.

WARREN B. GREGORY.